Dec. 9, 1952     J. D. COLE     2,621,088
BEARING ASSEMBLY
Filed Dec. 7, 1949
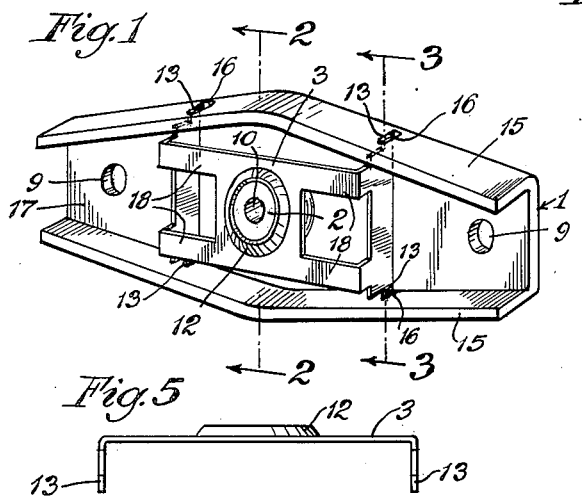
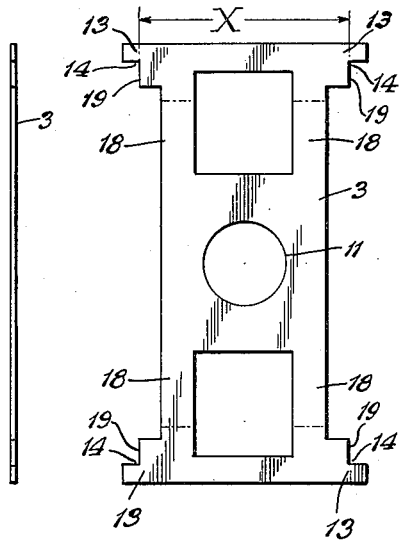
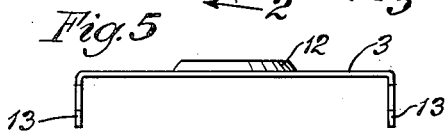
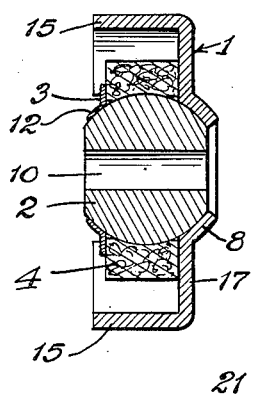
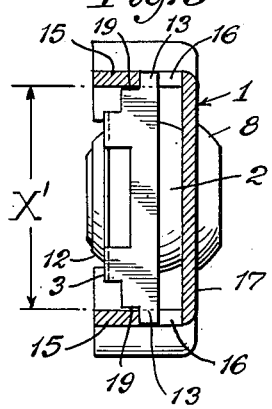
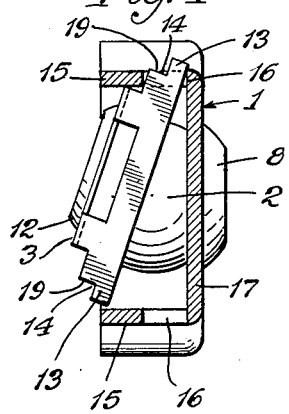
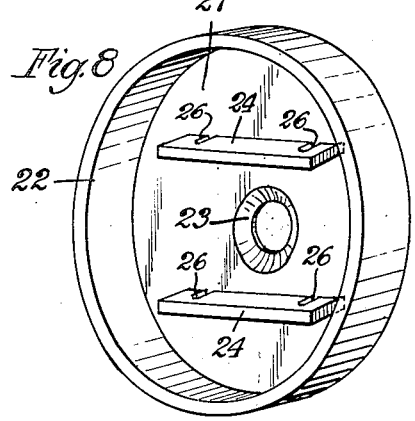
Inventor
James D. Cole
by Hans W. Hefter
Attorney Patented Dec. 9, 1952

2,621,088

UNITED STATES PATENT OFFICE 2,621,088

BEARING ASSEMBLY

James D. Cole, Park Ridge, Ill.

Application December 7, 1949, Serial No. 131,662

9 Claims. (Cl. 308—72)

1

The invention relates to a bearing assembly particularly adapted for electric motors of the fractional horsepower type.

It is an object of the invention to provide a bearing assembly for small motors and the like, which consists of a small number of easily assembled parts and contains a spherical bearing member which is universally adjustable and forms a bearing of the self-aligning type.

Another object of the invention is to provide a bearing assembly in which the individual parts are connected with each other without any soldering, brazing or welding or any other separate fastening members, such as screws and rivets, and which parts, if desired, may be readily separated from each other for cleaning, substitution or repair.

It is also an object of the invention to provide the bearing assembly with a spherical bearing member held yieldably and universally adjustable in position in a spherical socket of a bearing bracket adapted to be secured to the frame of a machine. The spherical bearing member is held yieldably in position in said spherical socket by a quickly releasable leaf spring and is easily exchangeable by another spherical bearing member of the same size, but which may have a different bore therethrough for receiving a shaft of a different diameter.

Other objects of the invention will be more fully pointed out in the description forming a part of this specification. It is to be understood, that the embodiment of the invention herein described relates to only one example and that various forms may be adopted within the scope of the claims.

In the accompanying drawing:

Fig. 1 is a perspective view of one embodiment of the bearing assembly of the invention, Fig. 2 is a cross sectional view of the bearing assembly on the line 2—2 of Fig. 1, Fig. 3 is a cross sectional view of the bearing assembly on the line 3—3 of Fig. 1, Fig. 4 is a view similar to Fig. 3, except that it illustrates the manner of assembling the bearing, Fig. 5 is a side elevation view of the leaf spring employed for holding the spherical bearing member in position, Fig. 6 is a plan view of the leaf spring blank, Fig. 7 is a side elevation of the leaf spring blank, and Fig. 8 illustrates a modification of a bearing bracket.

In the drawing, 1 designates a bearing bracket

2 made of a longitudinal piece of sheet metal stamped to have a U-shaped cross section. The center portion of the bearing bracket 1 is wider than the end portions and it will be noted that the flanges 15 along the longitudinal edges of the sheet metal piece are tapering toward the ends of the bracket. The center of the base portion 17 of the bracket 1 is provided with an apertured spherical socket 8. The ends of the base portion 17 are provided with apertures 9 for the reception of screws or tie bolts by means of which the bracket 1 may be attached to the frame of a machine, for instance an electric motor.

A spherical bearing member 2 which is provided with a diametrical bore 10 for supporting therein a shaft is fitted in the spherical socket 8 of the bracket 1, as particularly shown in Fig. 2, and is retained in said socket 8 by a resilient leaf spring 3 made from a stamped blank such as is shown in Figs. 6 and 7. This leaf spring is provided with a central circular aperture 11 which, when the leaf spring is formed into the shape as shown in Fig. 5, is surrounded by a spherical flange 12 for engaging one end of the spherical bearing member as shown in Fig. 2. The four corners of the leaf spring are provided each with two lateral projections 13 provided with a notch 14. The ends of the leaf spring 3 including the lateral projections 13 thereon are bent substantially at right angles to the main portion of the leaf spring 3, as shown in Fig. 5. Preferably, the leaf spring 3 is provided with two substantially rectangular apertures to both sides of the circular aperture 11 so as to form two pairs of resilient leg members 18 which assist in providing the required resiliency of the leaf spring. It should be noted that the distance X between the shoulders 19 of the extensions 13 (Fig. 6) is substantially equal to the distance X' (Fig. 3) between inner faces of the flanges 15 of the bracket 1 at the sectional plane 3—3. These flanges 15 are provided with apertures 16 for receiving the lateral projections 13 of the spring 3, as shown particularly in Fig. 3, in which the narrow ends of the extensions 13 engage the upper edge portion of the aperture 16. While the flanges 15 are continuous in that they extend from one end of the bracket to the other and lend rigidity to the structure, it is also contemplated to provide only short flanges at the places where the apertures 16 are required for the insertion of the lateral projections 13 of the leaf spring 3.

Fig. 4 illustrates the manner in which the bearing assembly is put together, or rather the manner in which the leaf spring 3 is united with the bearing bracket 1 for holding the spherical bearing member 2 in the spherical sockets formed in the base portion 17 of the bracket 1 and in the center portion of the leaf spring 3 respectively. The apertures 16 in the flanges 15 of the bracket 1 are of sufficient size to admit the wide portions of the lateral projections of the spring 3. After the lateral projections 13 on one side of the spring 3 have been inserted into two apertures 16, with the bearing member 2 arranged between the base of the bracket 1 and the spring 3, the spring 3 is pressed downwardly on the other side so that the narrow ends of the lateral projections 13 on the other side of the spring 3 are caused to enter their respective apertures 16 as shown in Fig. 3. In the assembled condition of the bearing, as shown in Figs. 1, 2 and 3, the narrow ends of the lateral projections 13 of the leaf spring 3 engage one edge of the apertures 16, and the shoulders 14 lie closely adjacent the inner faces of the flanges 15. In this locked position of the leaf spring 3, the center portion of the same urges the bearing member 2 yieldingly into the spherical socket 8 of the bracket 1.

It will be noted that the bearing assembly consists solely of three simple parts, namely, the bearing bracket 1, the leaf spring 3 and the spherical bearing member 2. While in the disclosed embodiment the flanges 15 of the bearing bracket taper from the center portion toward the ends of the bracket 1, it is believed to be obvious that, if desired, the flanges 15 may be arranged parallel to each other on the longitudinal sides of the bracket without deviating from the scope of the invention which resides in the locking engagement of the ends of the four corners of a leaf spring 3 with the apertures 16 in the flanges 15 of the bearing bracket 1 so as to hold the spherical bearing 2 in position between the base 17 of the bearing bracket and the center portion of the leaf spring 3.

If desired, an oil-soaked porous member 4 of felt or the like may be arranged between the base 17 of the bracket 1 and the spring 3, as shown in Fig. 2. The member 4 may have the shape of a conventional washer. The bearing member 2 is preferably made of a porous bearing metal and the oil in the member 4 is adapted to penetrate or flow around the bearing member 2 to lubricate the shaft in the bore 10. The oil from the oil-soaked member 4 also lubricates the spherical bearing surfaces between the bearing member 2 and the bracket 1 and spring 3 respectively.

The bearing assembly is of extremely simple, durable and rigid construction and the employment of any type of separate fastening members to hold the assembly together is dispensed with. The bearing bracket 1 and the leaf spring 3 are easily produced in a punch press. When assembled in the manner described all parts are properly located and centered with respect to each other and no misalignment, whatsoever, is apt to occur. Furthermore, the bearing member 2 may be made of a self-lubricating material in which case the oil-soaked member 4 need not be provided.

Fig. 8 illustrates a bearing bracket produced by a die casting operation, in which the bracket proper forms an end shell of a motor housing. The circular base 21 has a circumferential mounting flange 22 adapted to be connected in any desired manner to a motor housing (not shown). The centrally arranged spherical bearing socket is indicated at 23 as disposed between two substantially parallel walls 24 provided with two pairs of apertures 26 at their bases for receiving the lateral projections 13 of the leaf spring 3. The walls 24 are formed integral with the base 21, but if it should be desired to make the bearing bracket from a single piece of sheet metal by a stamping operation, the two parallel walls 24 would be stamped from the circular base 21.

What I claim is:

1. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an apertured spherical socket at its center and having two lateral projections at each end, said leaf spring in the assembled condition of the bearing in which said spherical bearing member engages the spherical sockets in said bearing bracket and said leaf spring respectively, is arranged between said opposed flanges of said bearing bracket, said flanges of said bearing bracket being provided with apertures into which extend the lateral projections provided on the ends of said leaf spring, whereby said spherical bearing member is resiliently maintained in operative position for universal adjustment relative to said spherical sockets.

2. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an apertured spherical socket at its center and having two lateral projections at each end, said leaf spring in the assembled condition of the bearing in which said spherical bearing member engages the spherical sockets in said bearing bracket and said leaf spring respectively, is arranged between said opposed flanges of said bearing bracket, said flanges of said bearing bracket being provided with apertures into which extend the lateral projections provided on the ends of said leaf spring, whereby said spherical bearing member is resiliently maintained in operative position for universal adjustment relative to said spherical sockets, and an oil soaked porous member between the base of said bearing bracket and said leaf spring and engaging said spherical bearing member.

3. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an apertured spherical socket at its center and having two lateral projections at each end, means on said projections forming a shoulder between their ends, said shoulders being arranged a predetermined distance away from the longitudinal center line of said leaf spring, the two opposed shoulders on the lateral projections at each end of said leaf spring being spaced a distance away from each other which is substantially equal to the distance between the inner faces of the opposed flanges of the bearing bracket at the points where the lateral projections of the leaf spring are positioned when in the assembled condition of the bearing the spherical socket of the leaf spring engages said spherical bearing member to urge the latter resiliently into the spherical socket formed in said bearing bracket, said flanges being provided with apertures of sufficient size to permit the passage of the widest portions of said lateral projections of said leaf spring, said shoulders in the assembled position of said bearing engaging the inner faces of said opposed flanges, while the narrow portions of said lateral projections which extend outwardly from said shoulders are positioned in said apertures of said flanges and are yieldingly urged against the edges of said apertures.

4. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an apertured spherical socket at its center and having two lateral projections at each end, means on said projections forming a shoulder between their ends, said shoulders being arranged a predetermined distance away from the longitudinal center line of said leaf spring, the two opposed shoulders on the lateral projections at each end of said leaf spring being spaced a distance away from each other which is substantially equal to the distance between the inner faces of the opposed flanges of the bearing bracket at the points where the lateral projections of the leaf spring are positioned when in the assembled condition of the bearing the spherical socket of the leaf spring engages said spherical bearing member to urge the latter resiliently into the spherical socket formed in said bearing bracket, said flanges being provided with apertures of sufficient size to permit the passage of the widest portions of said lateral projections of said leaf spring, said shoulders in the assembled position of said bearing engaging the inner faces of said opposed flanges, while the narrow portions of said lateral projections which extend outwardly from said shoulders are positioned in said apertures of said flanges and are yieldingly urged against the edges of said apertures, and an oil soaked porous member between the base of said bearing bracket and said leaf spring and engaging said spherical bearing member.

5. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an apertured spherical socket at its center and having its end portions bent at right angles with respect to the center portions of the leaf spring toward the base of the bearing bracket, said end portions being provided each with two projections extending transversely and outwardly from the longitudinal side edges of the leaf spring, means on said projections forming a shoulder between their ends, said shoulders being arranged a predetermined distance away from the longitudinal center line of said leaf spring, the two opposed shoulders on the lateral projections at each end of said leaf spring being spaced a distance away from each other which is substantially equal to the distance between the inner faces of the opposed flanges of the bearing bracket at the points where the projections of the leaf spring are positioned when in the assembled condition of the bearing the spherical socket of the leaf spring engages said spherical bearing member to urge the latter resiliently into the spherical socket formed in said bearing bracket, said flanges being provided with apertures of sufficient size to permit the passage of the widest portions of said projections of said leaf spring, said shoulders in the assembled position of said bearing engaging the inner faces of said opposed flanges, while the narrow portions of said projections which extend outwardly from said shoulders are positioned in said apertures of said flanges and are yieldingly urged against the edges of said apertures.

6. In a bearing assembly, a bearing bracket comprising a longitudinal sheet metal member having a centrally apertured base and two opposed flanges extending lengthwise of said base, the marginal portion of said aperture being deformed to form a spherical socket, a spherical bearing member having a diametrical bore for receiving a shaft, and a resilient leaf spring provided with an aperture at its center to receive said spherical bearing member and having two lateral projections at each end, said leaf spring in the assembled condition of the bearing in which said spherical bearing member engages said bearing bracket and said leaf spring being arranged between said opposed flanges of said bearing bracket, said flanges of said bearing bracket being provided with apertures into which extend the lateral projections provided on the ends of said leaf pring, whereby said spherical bearing member is resiliently maintained in operative position for universal adjustment.

7. In a bearing assembly, a bearing bracket comprising a longitudinal sheet metal member having a centrally apertured base and opposed flanges on the longitudinal sides of said base, the marginal portion of said aperture being deformed to form a spherical socket, a spherical bearing member having a diametrical bore for receiving a shaft, and a resilient leaf spring provided with an aperture at its center to receive said spherical bearing member and having two lateral projections at each end, said flanges of said bearing bracket being provided with apertures into which extend the lateral projections provided on the ends of said leaf spring, whereby said spherical bearing member is resiliently maintaind in operative position for universal adjustment.

8. In a bearing bracket assembly, a bracket, a spring and a spherical bearing, wherein said bracket is comprised of a circular base and a shell like member with an apertured bearing seat centrally located in said circular base and is further provided with notched spaced parallel walls, one on either side of said bearing seat, and wherein said spring is comprised of a centrally apertured resilient sheet metal member with laterally extending projections provided with stepped shoulders at the outer ends, said stepped shoulders in the assembled condition of the bearing engaging said notches in the bracket said parallel walls so as to maintain said bearing in operative position for universal adjustment.

9. In a bearing assembly, a bearing bracket comprising a member provided with a pair of spaced opposed walls and having an apertured bearing seat located centrally with respect to said walls, said walls being provided between their ends with notches for retaining a leaf spring composed of a longitudinal member extending lengthwise between said walls, said member being provided with a centrally located bearing seat and a plurality of laterally extending projections provided each with means forming a shoulder between their ends, said projections engaging the notches provided in said walls and said shoulders being positioned adjacent the inner faces of said walls, whereby a bearing member may be resiliently maintained in operative position for universal adjustment.

JAMES D. COLE.

REFERENCES CITED

The following references are of record in the file of this patent:

UNITED STATES PATENTS

| Number | Name | Date |
|---|---|---|
| 2,011,493 | Larsh | Aug. 13, 1935 |
| 2,448,500 | Turner | Aug. 31, 1948 |